US011403903B2

(12) United States Patent
Chaum

(10) Patent No.: US 11,403,903 B2
(45) Date of Patent: Aug. 2, 2022

(54) RANDOM SAMPLE ELECTIONS

(71) Applicant: David Chaum, Sherman Oaks, CA (US)

(72) Inventor: David Chaum, Sherman Oaks, CA (US)

(73) Assignee: Digital Community LLC, Sherman Oaks, CA (US)

( * ) Notice: Subject to any disclaimer, the term of this patent is extended or adjusted under 35 U.S.C. 154(b) by 0 days.

(21) Appl. No.: 16/103,572

(22) Filed: Aug. 14, 2018

(65) Prior Publication Data

US 2019/0005756 A1    Jan. 3, 2019

Related U.S. Application Data

(63) Continuation-in-part of application No. 15/405,395, filed on Jan. 13, 2017, now Pat. No. 10,050,786, which is a continuation-in-part of application No. 14/237,991, filed as application No. PCT/US2012/000287 on Jun. 18, 2012, now abandoned.

(Continued)

(51) Int. Cl.
    *G07C 13/00*        (2006.01)
    *H04L 9/30*         (2006.01)
    *H04L 9/08*         (2006.01)
    *H04L 9/32*         (2006.01)

(52) U.S. Cl.
    CPC .............. *G07C 13/00* (2013.01); *H04L 9/085* (2013.01); *H04L 9/30* (2013.01); *H04L 9/3236* (2013.01); *G06Q 2220/00* (2013.01); *G06Q 2230/00* (2013.01); *H04L 2209/38* (2013.01); *H04L 2209/463* (2013.01)

(58) Field of Classification Search
    CPC ... H04L 2209/463; H04L 9/321; H04L 9/085; H04L 9/30; H04L 9/3236; H04L 2209/38; G06Q 30/02; G06Q 2220/00; G06Q 2230/00; G07C 13/00
    See application file for complete search history.

(56) References Cited

U.S. PATENT DOCUMENTS 7,260,552 B2    8/2007    Jorba et al.
7,306,148 B1    12/2007    Morganstein
(Continued)

FOREIGN PATENT DOCUMENTS

EP      1 469 429      10/2004

OTHER PUBLICATIONS

Parkes et al., "Thwarting Vote Buying Through Decoy Ballots", 4th Workshop on Exploring Beyond the Worst Case in Computational Social Choice (Explore 2017). Held as part of the Workshops at the 16th International Conference on Autonomous Agents and Multiagent Systems. May 8-9, 2017.

*Primary Examiner* — Joseph P Hirl
*Assistant Examiner* — Stephen T Gundry
(74) *Attorney, Agent, or Firm* — Clark & Brody LP

(57) ABSTRACT

A method allows a random sample of a large population of voters to cast votes and for both the unpredictability/unmanipulability of the sample selection and the integrity of the tally to be verified by any interested parties using public information. The problem of vote selling is addressed. Also, a variant allows voters to remain substantially anonymous.

12 Claims, 12 Drawing Sheets

Related U.S. Application Data

(60) Provisional application No. 61/498,597, filed on Jun. 19, 2011.

(56) References Cited

U.S. PATENT DOCUMENTS

| | | |
|---|---|---|
| 7,451,928 B2 | 11/2008 | Peterson |
| 7,516,891 B2 | 4/2009 | Chaum |
| 7,621,450 B2 | 11/2009 | Haas |
| 8,123,114 B2 * | 2/2012 | Chaum ............... G07C 13/00 235/50 A |
| 8,297,506 B2 * | 10/2012 | Backert ............. G06F 21/6263 235/386 |
| 8,688,790 B2 * | 4/2014 | LeVasseur ............ H04L 51/34 709/219 |
| 9,401,059 B2 * | 7/2016 | Backert ............... H04L 9/3249 |
| 9,401,900 B2 * | 7/2016 | LeVasseur ............ H04L 51/24 |
| 9,536,366 B2 | 1/2017 | Garfinkle |
| 9,569,905 B2 * | 2/2017 | Cohen ............... G07C 13/00 |
| 9,922,332 B2 * | 3/2018 | Sant'Anselmo ....... G06Q 20/10 |
| 10,021,062 B2 * | 7/2018 | LeVasseur ............ G06F 21/602 |
| 11,049,349 B2 * | 6/2021 | Onischuk ............. G07C 13/00 |
| 2003/0104859 A1 | 6/2003 | Chaum |
| 2003/0154124 A1 | 8/2003 | Neff |
| 2003/0158775 A1 | 8/2003 | Chaum |
| 2004/0169077 A1 | 9/2004 | Petersen et al. |
| 2007/0005713 A1 * | 1/2007 | LeVasseur ........... H04L 63/126 709/206 |
| 2007/0095909 A1 | 5/2007 | Chaum |
| 2007/0192176 A1 * | 8/2007 | Onischuk ............. B42D 15/00 705/12 |
| 2007/0241190 A1 | 10/2007 | Hotto |
| 2007/0267492 A1 | 11/2007 | Maclaine Pont |
| 2008/0000969 A1 | 1/2008 | Salomonsen |
| 2008/0035728 A1 | 2/2008 | Petersen |
| 2008/0103881 A1 | 5/2008 | Morganstein |
| 2008/0110985 A1 | 5/2008 | Cohen et al. |
| 2008/0272194 A1 | 11/2008 | Chaum |
| 2008/0281682 A1 | 11/2008 | Euchner |
| 2009/0037260 A1 | 2/2009 | Felten |
| 2009/0072030 A1 | 3/2009 | Cardone |
| 2009/0072031 A1 | 3/2009 | Cardone |
| 2009/0072032 A1 | 3/2009 | Cardone |
| 2009/0076891 A1 | 3/2009 | Cardone |
| 2009/0127335 A1 | 5/2009 | Seliger |
| 2009/0159655 A1 | 6/2009 | Haas |
| 2009/0179071 A1 | 7/2009 | Backert |
| 2009/0307065 A1 | 12/2009 | Kincaid |
| 2009/0308922 A1 * | 12/2009 | Chaum ................ B42D 15/00 235/386 |
| 2010/0025466 A1 | 2/2010 | Cardone |
| 2010/0121765 A1 | 5/2010 | Ahrens |
| 2010/0142005 A1 | 6/2010 | Roskind |
| 2010/0241493 A1 | 9/2010 | Onischuk |
| 2010/0252628 A1 * | 10/2010 | Chung ................ G07C 13/00 235/386 |
| 2011/0089236 A1 * | 4/2011 | Chung ................ G07C 13/00 235/386 |
| 2011/0113109 A1 * | 5/2011 | LeVasseur ............ H04L 51/12 709/206 |
| 2011/0213700 A1 * | 9/2011 | Sant'Anselmo ....... G06Q 10/10 705/39 |
| 2011/0238463 A1 | 9/2011 | Marchal |
| 2012/0053997 A1 | 3/2012 | Garfinkle |
| 2012/0132713 A1 * | 5/2012 | Chaum ................ G07C 13/00 101/483 |
| 2012/0179514 A1 | 7/2012 | Cohen |
| 2012/0198017 A1 * | 8/2012 | LeVasseur ............ H04L 51/24 709/206 |
| 2013/0014233 A1 | 1/2013 | Backert |
| 2013/0173356 A1 * | 7/2013 | Backert ............... H04L 9/3249 705/12 |
| 2014/0172517 A1 * | 6/2014 | Chaum ................ G06Q 30/02 705/12 |
| 2014/0365281 A1 | 12/2014 | Onischuk |
| 2015/0012339 A1 | 1/2015 | Onischuk |
| 2015/0310686 A1 | 10/2015 | Backert |
| 2017/0200338 A1 | 7/2017 | Chaum |
| 2018/0054414 A1 * | 2/2018 | LeVasseur ............ G06F 21/445 |
| 2018/0350180 A1 * | 12/2018 | Onischuk ............. G07C 13/00 |

\* cited by examiner

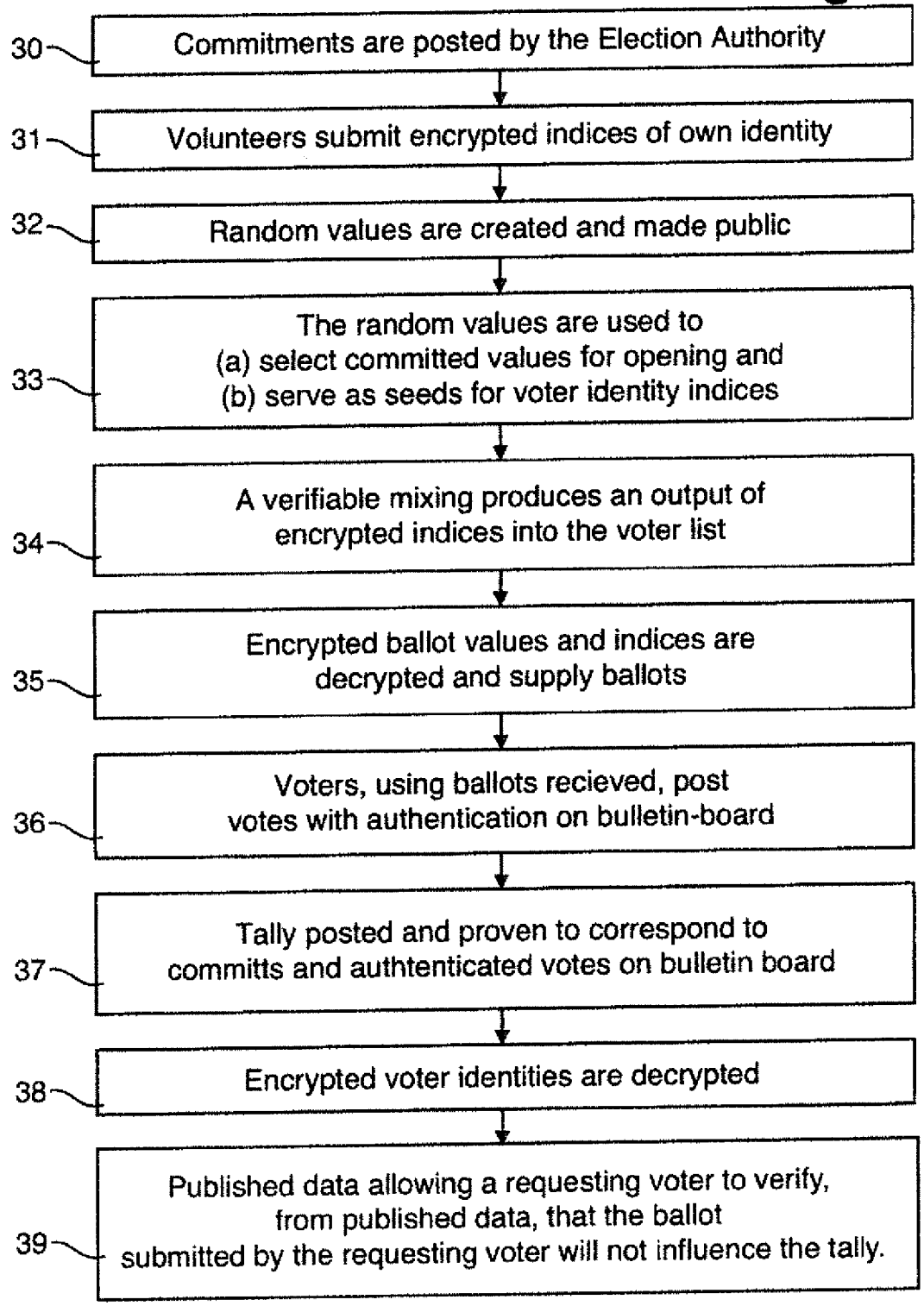

YES/NO BALLOT
Instructions: Choose one of upper or lower ballot and use its vote code to vote.

Serial #100a
vote code: vote:
9343       YES
8584       NO

Serial #100b
vote code: vote:
1134       YES
7653       NO

YES/NO BALLOT
Instructions: Choose one of upper or lower ballot and use its vote code to vote.

Serial #101a
vote code: vote:
2843       YES
6533       NO

Serial #101b
vote code: vote:
2286       YES
8282       NO

Fig. 4A

Vote
Code:    Vote:
Serial#:

101a  6533  NO
100b  7653  NO
100a  9343  YES
101a  2843  YES
101b  8282  NO
100b  1134  YES
101b  2286  YES
100a  8584  NO

Vote
Code:    Vote:
Serial#:

101a  6533  NO
100b  7653  NO
100a  9343  YES
101a  2843  YES
101b  8282  NO
100b  1134  YES
101b  2286  YES
100a  8584  NO

Fig. 4D

YES/NO BALLOT
*Instructions: Choose one of upper or lower ballot and use its vote code to vote.*

Serial #100a
| vote code: | vote: |
|---|---|
| 9343 | YES |
| 8584 | NO |

Serial #100b
| vote code: | vote: |
|---|---|
| 1134 | YES |
| 7653 | NO |

Fig. 7A

YES/NO BALLOT
*Instructions: Choose one of upper or lower ballot and use its vote code to vote.*

Serial #101a
| vote code: | vote: |
|---|---|
| 2843 | YES |
| 6533 | NO |

Serial #101b
| vote code: | vote: |
|---|---|
| 2286 | YES |
| 8282 | NO |

Fig. 7A

| Serial#: | Vote Code: | Vote: | Countable/ Dummy: |
|---|---|---|---|
| #101a | 6533 | NO | D |
| #100b | 7653 | NO | C |
| #100a | 9343 | YES | C |
| #101a | 2843 | YES | D |
| #101b | 8282 | NO | D |
| #100b | 1134 | YES | C |
| #101b | 2286 | YES | D |
| #100a | 8584 | NO | C |

| Serial#: | Vote Code: | Vote: | Countable/ Dummy: |
|---|---|---|---|
| #101a | 6533 | NO | D |
| #100b | 7653 | NO | C |
| #100a | 9343 | YES | C |
| #101a | 2843 | YES | D |
| #101b | 8282 | NO | D |
| #100b | 1134 | YES | C |
| #101b | 2286 | YES | D |
| #100a | 8584 | NO | C |

Fig. 7D

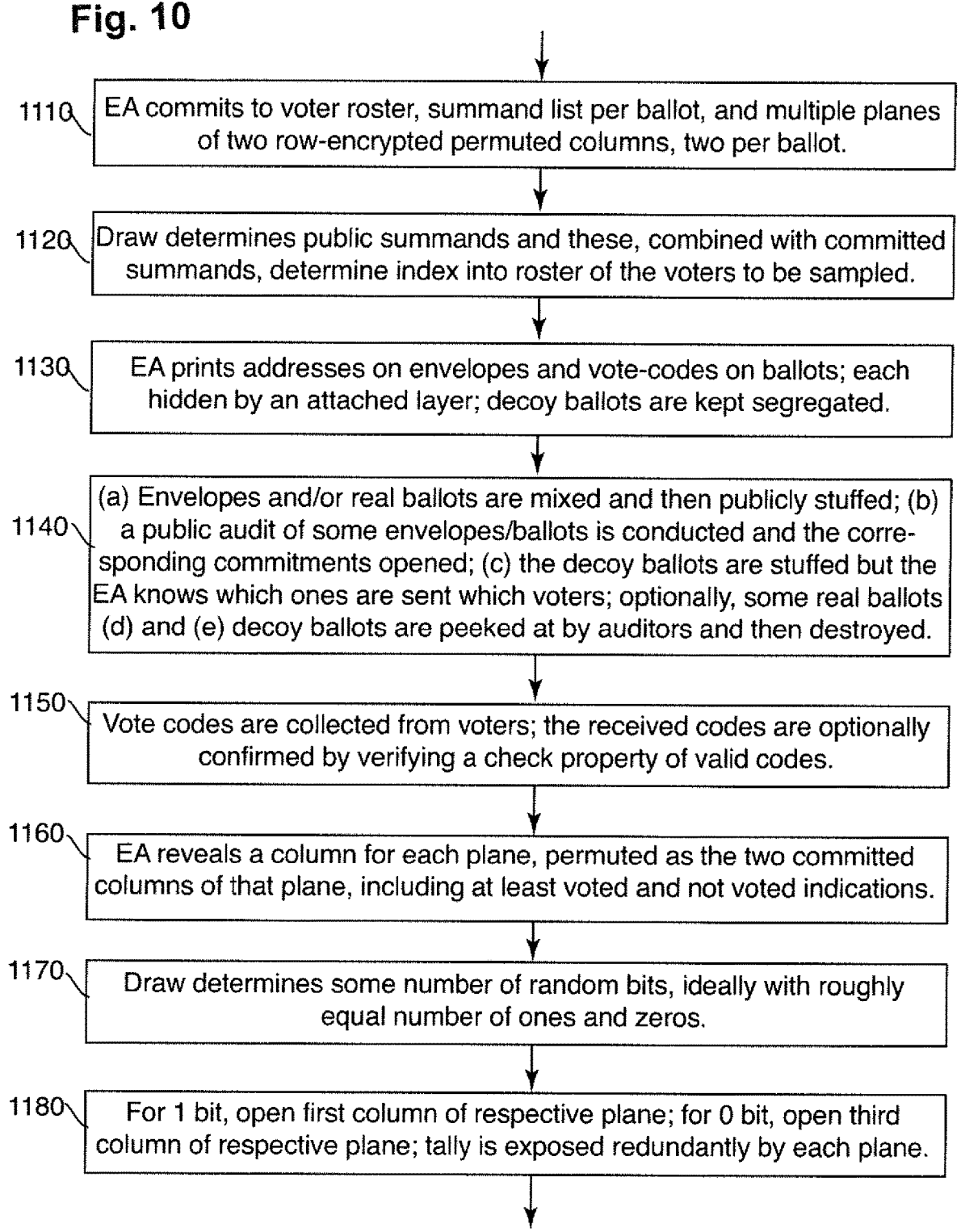

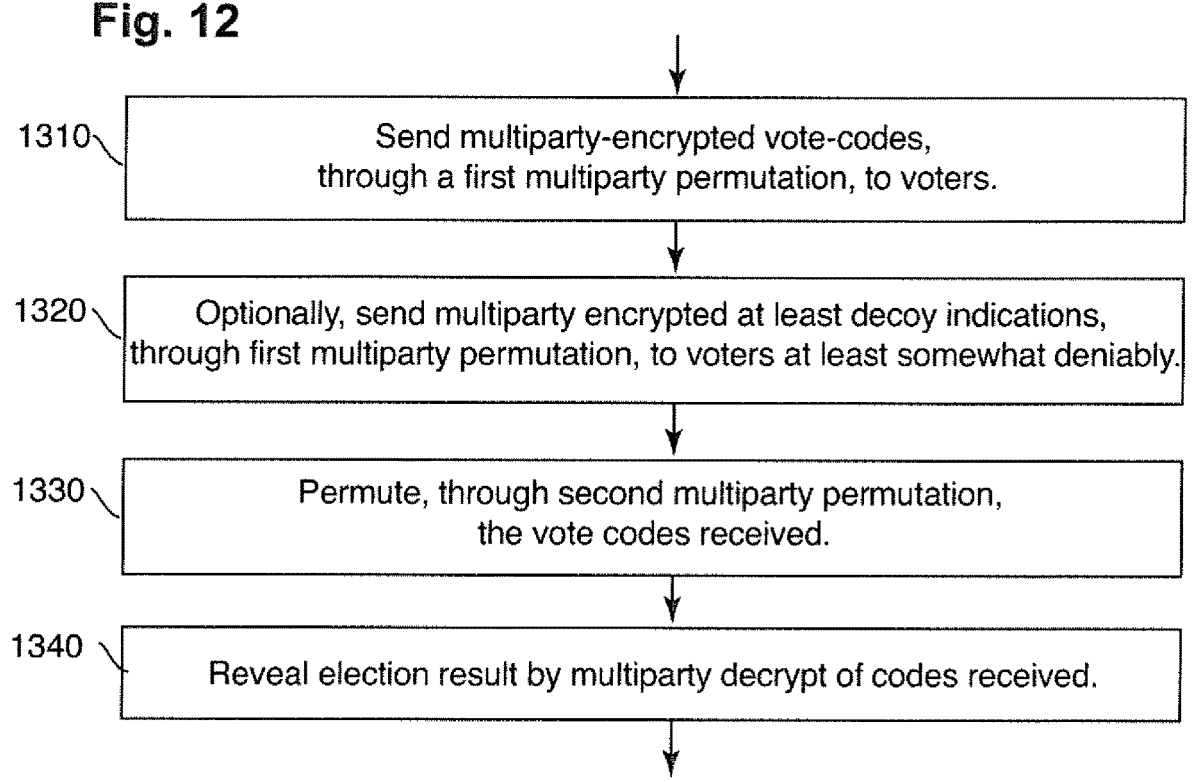

RANDOM SAMPLE ELECTIONS

The present application is a Continuation-in-Part of U.S. patent application Ser. No. 15/405,395 filed on Jan. 13, 2017, which is a Continuation-in-Part of U.S. patent application Ser. No. 14/237,991 filed on Feb. 10, 2014, which is a National Phase of PCT/US2012/000287 filed on Jun. 18, 2012, which claims benefit of U.S. Provisional Application No. 61/498,597 filed on Jun. 19, 2011. All of these applications are incorporated by reference in their entirety in this continuation in part application.

FIELD OF THE INVENTION

The invention is in the general field of polling, and more specifically where not all eligible persons are per poll.

BACKGROUND ART

Commercial and social advantage may result from a technique whereby a population can be polled, whether or not binding, with a result that is believed more representative and/or convincing than what is achieved by elections today.

BRIEF DESCRIPTION OF THE DRAWING FIGURES

FIG. 3 shows a detailed exemplary combination cryptographic protocol, functional, flow chart, and block diagram of a requesting voter non-count verification in accordance with the teachings of the invention.

FIG. 4A-D show a detailed exemplary combination cryptographic protocol, functional, and block diagram of an exemplary voting system with integrity that can be verified by any interested party in accordance with the teachings of the invention.

Figure 5:
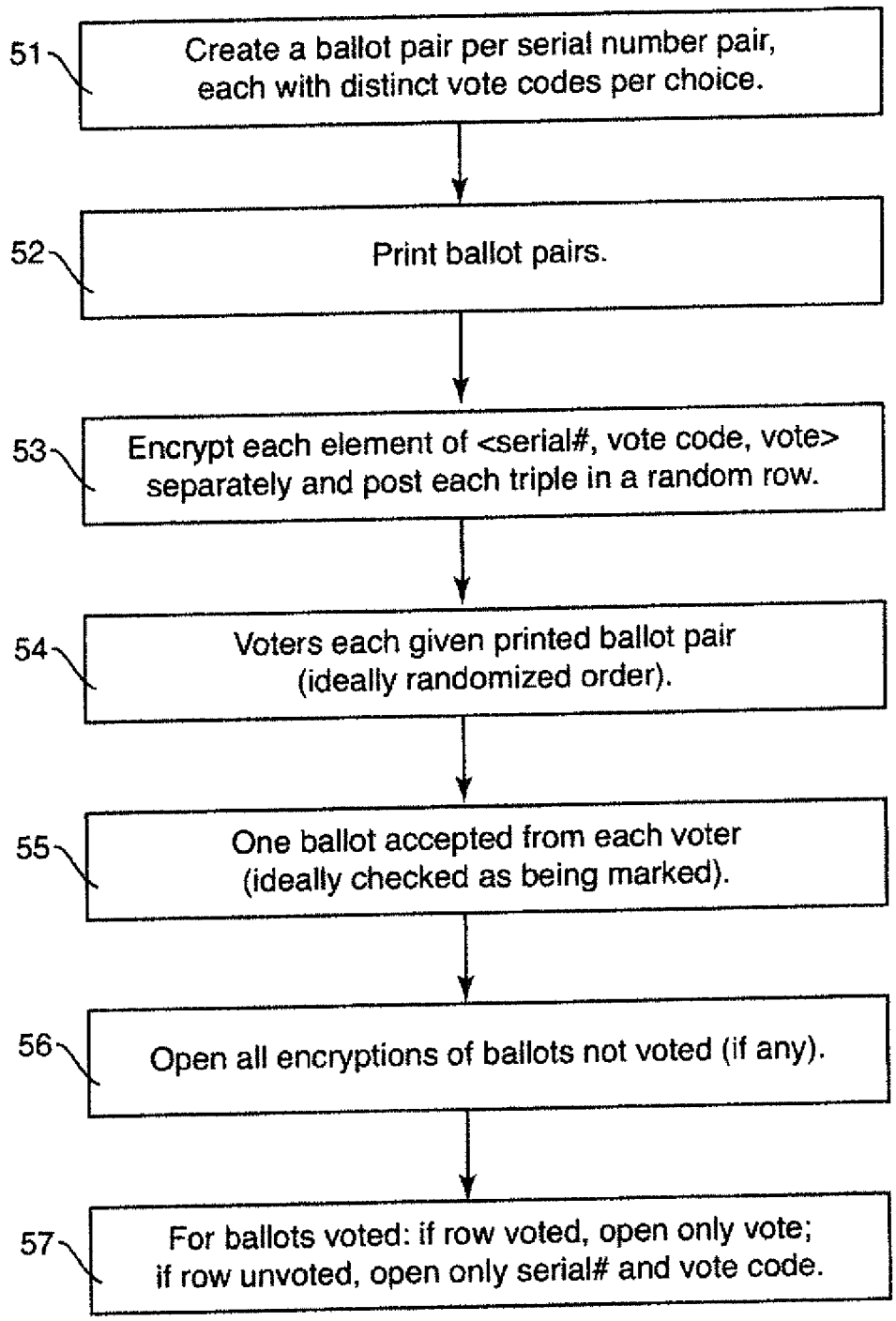

FIG. 5 shows a detailed exemplary combination flow chart, cryptographic protocol, functional, and block diagram of an exemplary voting system with integrity that can be verified by any interested party in accordance with the teachings of the invention.

Figure 6:
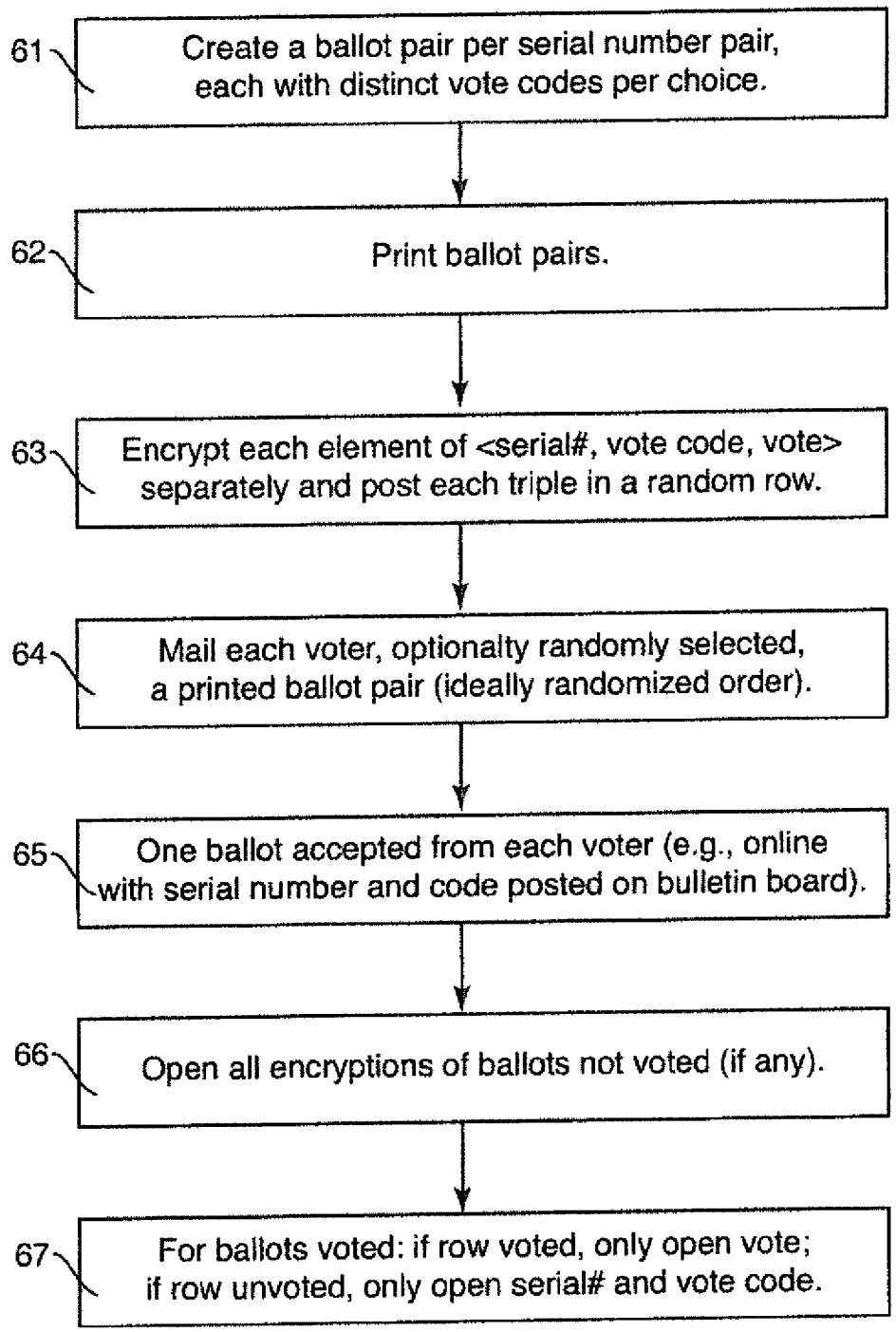

FIG. 6 shows a detailed exemplary combination flow chart, cryptographic protocol, functional, and block diagram of an exemplary remote voting system with randomly selected voters and integrity that can be verified by any interested party in accordance with the teachings of the invention.

FIG. 7A-D show a detailed exemplary combination cryptographic protocol, functional, and block diagram of an exemplary remote voting system with decoy ballots and integrity that may be verified by any interested party in accordance with the invention.

Figure 8:
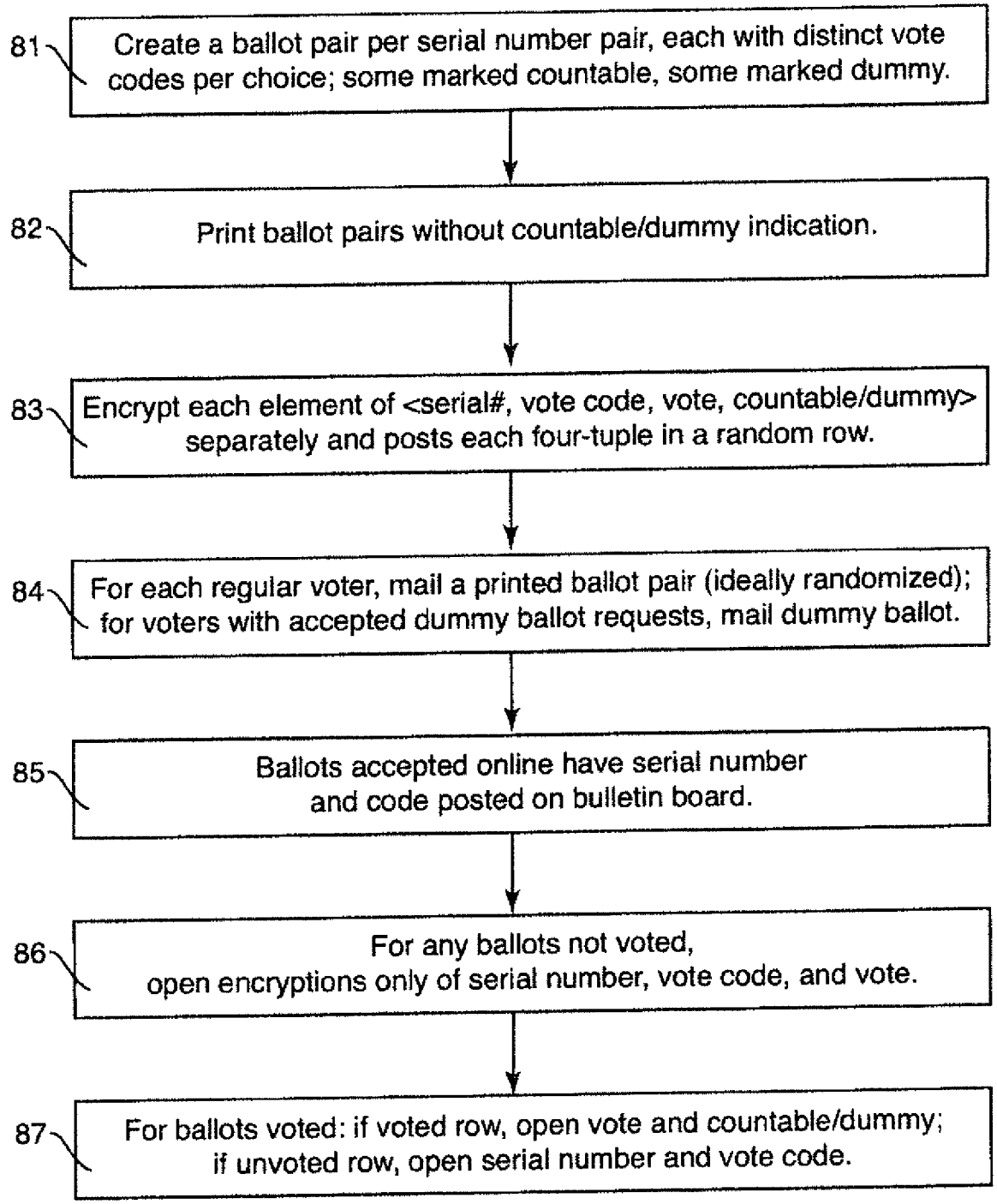

FIG. 8 shows a detailed exemplary combination flow chart, cryptographic protocol, functional, and block diagram of an exemplary remote voting system with randomly selected voters, decoy ballots, and integrity that may be verified by any interested party in accordance with the teachings of the invention.

Figure 9:
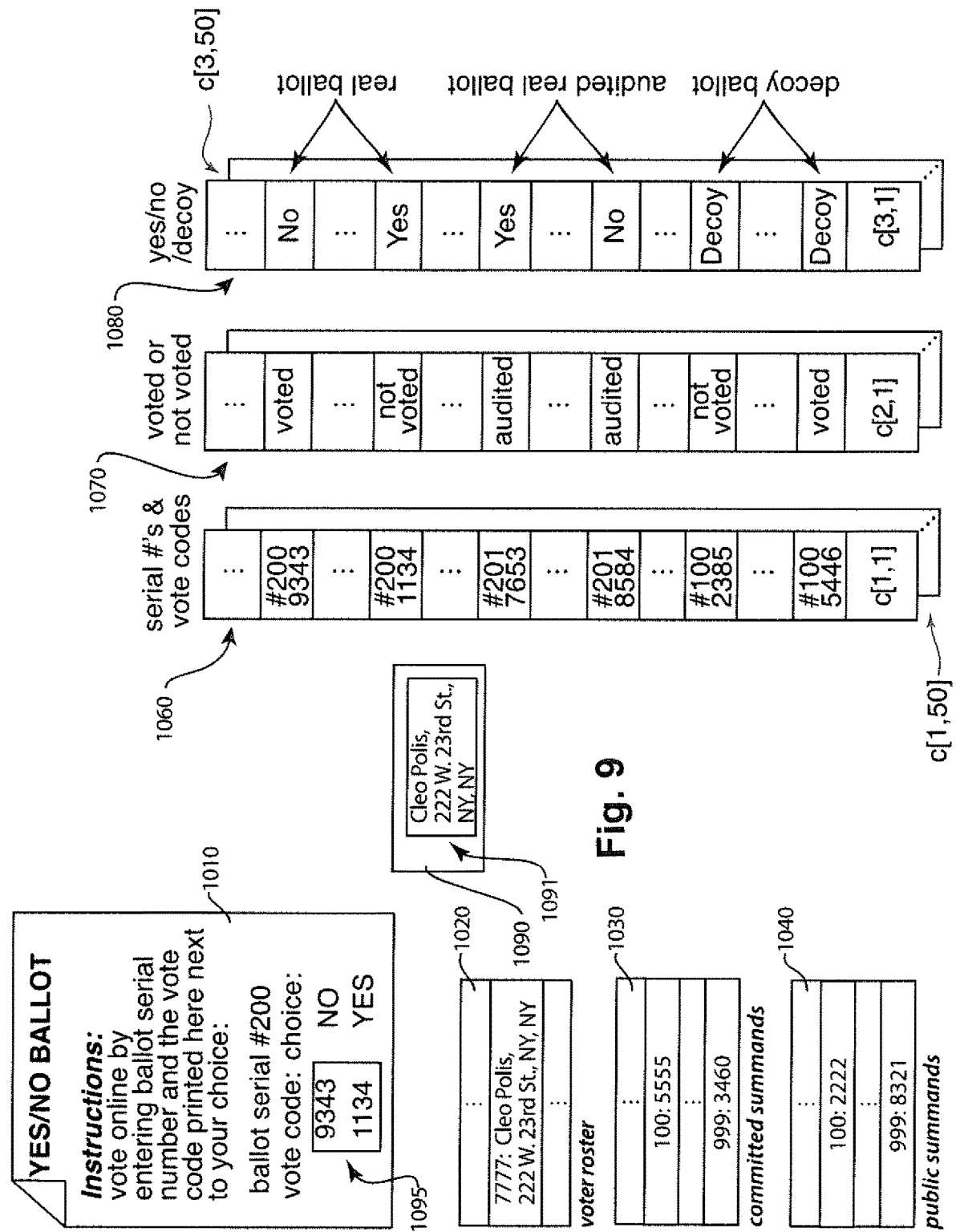

FIG. 9 shows a combination block and cryptographic protocol diagram of secure sample voting.

FIG. 10 shows a step block diagram of secure sample voting.

Figure 11B:
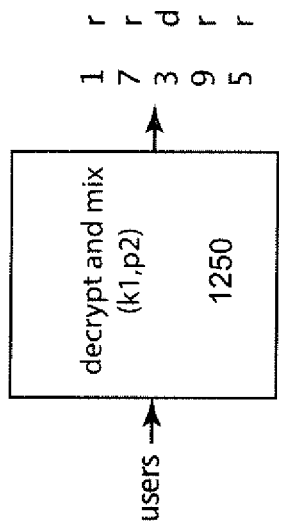
Figure 11A:
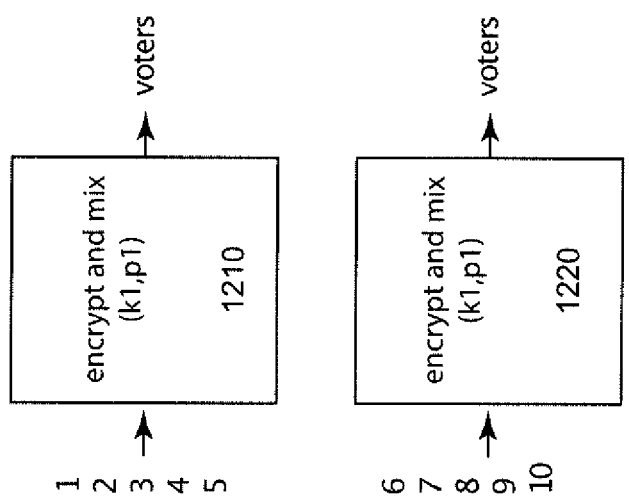

FIG. 11A shows a detailed combination block and schematic diagram of an exemplary multiparty election authority voting system, including providing of ballots, including optionally decoy ballots, to potential voters.

FIG. 11B relates to FIG. 11A and shows voting by voters and the revealing of results of a corresponding election.

FIG. 12 shows a detailed combination flowchart and block diagram of an exemplary multiparty election authority voting system.

BRIEF SUMMARY OF THE INVENTION

This section introduces some of the inventive concepts in a way that will readily be appreciated, but that may make significant simplifications and omissions for clarity and should accordingly not be taken to limit their scope in any way; the next section presents more detailed descriptions.

Random-sample election techniques can it is believed further advantageously have a cost for a large population that may be several orders of magnitude less than that of conducting a conventional election. The properties that are believed achievable in some example random-sample elections may be summarized as follows:

Only votes from randomly selected voters are counted.
Integrity of the published tally of votes cast is cryptographically proved.
Vote buying and other "improper influence" of voters is difficult or even impractical.
Ballot secrecy violation requires collusion/compromise of election authority or the underlying cryptography.
Voters can optionally be compensated for valid participation (even based on a test to determine that they made consistent answers to the questions).
Voters can optionally remain substantially anonymous from all but the election authority.

A method for randomly sampling votes from a relatively large population of persons comprising: committing publicly to information based on first key information that will determine selected persons from first public random values, the first public random values to be realized later; committing publicly to information based on second key information including for audit of ballot information and related tally information responsive to at least second public random values, the second public random values to be realized later; providing ballot information, after the first public random values are realized, to the persons selected by the first public random values realized; accepting and making public voted ballot information related to the ballot information provided at least to the selected persons; making public a tabulation of the voted ballot information; establishing, by revealing information related to the second key information, that the tally corresponds at least substantially with high probability to the voted ballot information; and revealing the identity of selected persons after the vote information is accepted and made public.

The method just described, further comprising: receiving participation requests each related to a requesting person; providing ballot information to the requesting persons; accepting and making public voted ballot information related to the participation requesting ballots; making public the tabulation that includes the votes related to ballots selected but does not include any votes related to participation requested ballots; and such that the information supplied to and that made public related to requesting persons is substantially unrecognizable as to whether it is related to requesting persons or related to selected persons.

Either of the two methods just described, further comprising revealing the identity of requesting voters along with those of selected voters. Either of the three methods just described, further comprising making the identity of the voters revealed public. Any of the methods just described, apart from the previous one just described, further comprising only revealing the identity of the voter to a verifier person also selected at random and making the identity of the verifier person public at least after the votes are cast.

General Description

A general description of an exemplary embodiment will be provided as will be appreciated without limitation and making certain simplifications for clarity as will be understood.

A pre-agreed public random process, such as stock-market closing data, determines which voters are to receive ballots that will be counted. Although the voters are publicly verifiable as selected by the results of the random process, their identity is hidden at least initially. Those ballots sent to the randomly selected voters will be known to those voters to be at least very likely counted, as a consequence of a public cryptographic proof. Anyone can, however, request a ballot that will not be counted. Because such requested ballots will only be distinguishable by the requesting voter, they can be sold to vote buyers and are believed more likely to be sold than the countable ballots.

The identity of all voters may be made public once voting is over. Alternatively, a number of "verifiers" may be selected at random, provided with instructions, and only later would the identity of verifiers be made public. Each verifier is provided the identity of a different one of the voters and instructed to contact that voter and ensure that the voter has in fact cast the ballot—and to raise an alarm otherwise. Voters may obtain a code, also known but only in random parts to the verifier, so that the verifier can be convinced that the voter did in fact receive a ballot and verifiers can provide evidence of successful verification they performed. Verifiers may be employed for counted and even uncounted voters. Verifiers, as well as optionally voters who answer verifier queries, may collect rewards. Of course if ballots are sent "signature required," then the authority has some recourse against a voter falsely crying foul.

The participants in a simplified example are the Election Authority and

Three classes of members of the public:
(1) randomly-selected voters whose votes will be counted;
(2) self-selected voters whose votes will not be counted; and
(3) optionally, randomly selected verifiers who do not vote but rather check that a corresponding voter did participate.

Another embodiment of the invention includes a computerized cryptographic method for at least one election authority to conduct an election where at least some voters vote remotely and the integrity of the corresponding tally can substantially be verified by any interested party, The method includes the at least one election authority providing ballots to voters with the ballots including vote-codes, receiving from at least one voter at least one of the vote-codes, such that the selection of at least which voters receive which or any ballots being substantially difficult for the election authority to manipulate; and such that at least from some observers at least something is hidden about which voters receive which ballots or which vote codes.

The voting method can also include the step of at least one election authority issuing at least one decoy ballot; and the decoy ballots being provided by a method selected from the group consisting of: unpredictable, responsive to requests, an auction, and algorithmically responsive at least to information about voters, and the at least one decoy ballot not contributing a vote in the tally.

Further in the voting method, at least one of the at least one voter that a decoy ballot is issued to being supplied a substantial proof that the ballot is a decoy.

In the method above, providing of ballots can include including physically combining ballots with hidden vote codes within envelopes that are addressed with temporarily hidden addresses, and/or the providing of ballots including a multiparty mixing of recipients of the vote codes.

The providing of ballots can include a multiparty transformation of the vote codes as well as including a mixing of decoy ballots along with real ballots.

The inventive method can also include the step of delivering to voters receiving decoy ballots by deniable encryption an indication of whether the ballot is a decoy.

DETAILED DESCRIPTION OF PREFERRED EMBODIMENTS

Detailed descriptions are presented here of various sufficient to allow those of skill in the art to use the exemplary preferred embodiments of the inventive concepts.

Figure 1:
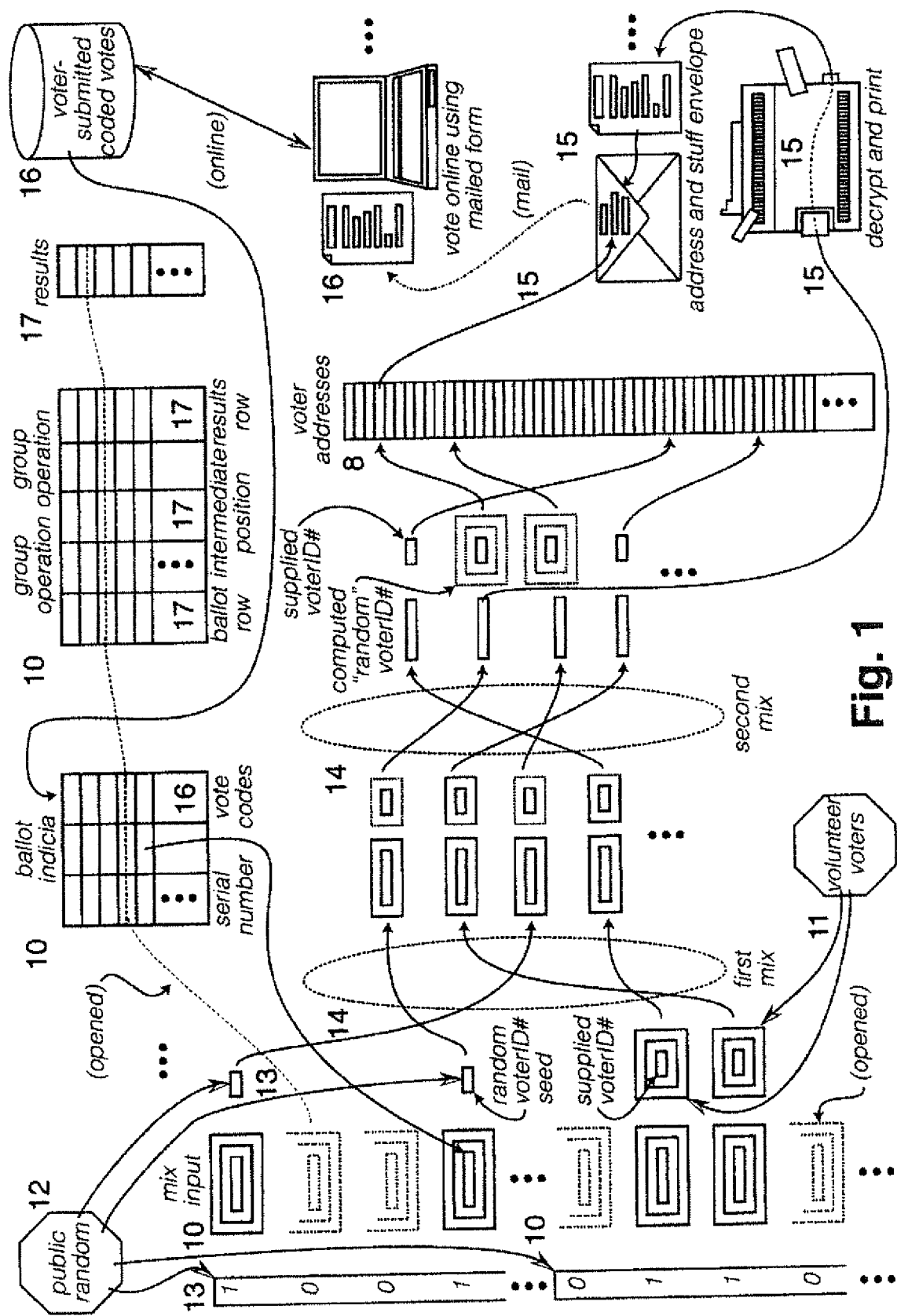
FIG. 1 shows a combination flowchart and cryptographic protocol diagram of an exemplary embodiment of an overall voting system aspect in accordance with the teachings the invention.

Turning now to FIG. 1, a detailed combination cryptographic protocol, functional, flowchart and block diagram of an overall exemplary random-sample voting process will be provided. A random-sample election can be conducted in nine steps as indicated in FIG. 1 by the step numbers and as will also be further described with reference to FIG. 2.

Referring now to step 10, commitments are posted by the election administrator defining: (a) the countable ballots, (b) the uncounted ballots, and (c) combined tabulation tables for both types of ballots.

More particularly, encrypted values sometimes called "commitments" are made public, such as by posting online, for instance, replicated and/or in a digitally signed form.

Each countable and uncountable ballot entry, shown arrayed vertically, consists in the example of a pair made up of two components. The first component is of the same type, whereas the second component differs for the countable and uncountable ballots. The first component, in the example, is a so-called mix input item sometimes referred to as an "onion." It is a nested or iterated layering of public key encryption, as is known, with what will be called the "payload" at its innermost core being the ballot indicia from the combined tabulation tables to be described. The second component, continuing the example, is for the uncountable ballots, supplied in step 11 to be described, and for the countable ballots, as described in step 12.

Some combined tabulation table columns include commitments and other columns are empty and will be filled later. The tables relate to what has been called a "voter verifiable" or sometimes "end-to-end" election system, such as those previously disclosed by the present applicant under the rubric "Punchscan" or "Scantegrity," such as have been used in binding elections. The example chosen for clarity is like that of Punchscan as used by Scantegrity, where there are three tables, shown left to right, as will be understood and familiar: (a) serial numbers, "indicia" to be printed on ballot, and the corresponding "vote codes"; (b) a pointer to the ballot row, the group operation relating the ballot row entry to the intermediate position entry, a second group operation relating the intermediate position to the row pointer for the results row; and (c) the results column. The rows of the second and third tables are independently randomly permuted. Initially the vote codes, ballot row and results row pointer, and results columns are empty; the other columns are filled with commits.

One example way, described here for clarity but without limitation, to keep the ballots submitted by volunteers from having their votes included in the tally is for the corresponding "results row" entries already described to be pre-filled for these ballots with an indication that the vote will not be counted.

Referring to step 11, volunteers submit multiply-encrypted values with a so-called "payload" or here "seed" that will result in their own address being selected.

More particularly, each volunteer allowed may provide a mix input, much as already described for the first components, but with a payload that is an "encrypted" index into the list of voter addresses, to be described further with reference to steps 15 and 18.

Referring to step 12, "Public random" values are created in a pre-agreed manner, such as a cryptographic hash of certain stock market closing data, that should be unpredictable earlier than the completion of steps 10 and 11.

More particularly, such public random values are known and used, for instance, in lotteries and in voter-verifiable election systems more generally. Prior to a certain time, it is believed infeasible to predict the values or even some functions of the values.

Referring to step 13, the random values from step 12 are used: (a) to select which committed values from step 11 are to be opened; and (b) as random seeds for cryptographically-generated voter identity indexes. The random seeds are processed as the constructed second components are, with the result believed hard to predict. When a random value is processed through a mix that performs operations that would result in successive layers of encryption being stripped off (had they been applied in the first place), as will be understood by one of skill in the cryptographic protocol art, what results is a number (from the same range as can be generated from a user-constructed mix input), which can map nearly uniformly to a user identity or address. Typically, the results at each stage of processing through the mix are "restricted," such as by truncation of enough bits, so that reverse-engineering the mapping from input to output becomes computationally infeasible.

More particularly, by processing the random seeds as if they were onions, by what may in effect be in some examples application of one or more digital signatures, the resulting value is hard to predict by those without the signing keys. This will also be further described with reference to step 14.

Also, in the present example, some such values are used to determine which of the committed values from step 10 already described are to be decrypted in a publicly verifiable manner, referred to here as "opened." This is a known use and the example includes a random selection of pairs and the rows of the voter-verifiable election tables that match the pairs in ballot indicia, as already mentioned as included in the pairs of the first table. Such opening of randomly selected rows in the tables is known to provide a kind of audit of whether the table content is correctly formed, as will be understood.

Referring to step 14, a verifiable mix cascade is conducted, establishing that the batch of input pairs consisting of both types (random voter identities and submitted voter identities) are successively decrypted and mixed to produce an output batch of encrypted indices into the voter address list.

More particularly, the mix in the example is shown as what was called a "cascade" when the notion of mixing was first disclosed, in "Untraceable electronic mail, return addresses, and digital pseudonyms," Communications of the ACM, Volume 24, Issue 2, February 1981, by the present applicant. Verifiability may be obtained by various interactive or non-interactive cryptographic proof techniques, as are known in an extensive literature tracing back, for instance, to early results presented by Sako and Kilian in "Receipt-free mix-type voting scheme," Advances in Cryptology—EUROCRYPT '95, Springer-Verlag, 1995. Parallel application of a protocol, in what has been called "coordinated instances," allows the components of a pair to be treated in the same or in a different manner, but for the association of the components to be maintained, as will be understood.

It will however be noted that in the present example system two different types of second-component items are mixed: random values and prepared mix input items. Processing of the latter yields the known decryption. Processing of the former, however, may be regarded as the nested or iterated application of digital signatures. The result is believed mainly unpredictable without the signing keys. In the present example, the final signing is not applied or a committed key is not revealed that compresses the values to the range of valid indices to the voter address list, as will also be further described with reference to step 18.

Referring to step 15, the encrypted ballot values are decrypted from the mix output batch and printed and mailed to the corresponding voter address found by indexing the table of voter addresses.

More particularly, the final second components of the final mix batch are used, as has been mentioned already with reference to step 14, to select respective voter addresses from the list of such addresses shown, as mentioned as will be further described with reference to step 18. The paired vote ballot indicia, also not revealed in cleartext, is also decrypted. Thus, pairs of ballot indicia and voter address are determined by the devices/system called out as "decrypt and print" in the figure. The result is printed material, in the example, including a ballot with the indicia, not visible from the outside, and the address visible from the outside. This may be accomplished by conventional means, such as printing a ballot form and stuffing it in an envelope with the delivery address applied to it. These addressed items are delivered to voters, for instance, such as by being mailed or couriered with or without tracking or signature required.

Referring to step 16, voters cast ballots for instance online using the mail they receive, which results in coded votes on an electronic bulletin board.

More particularly, the voter provides the codes through a web browser or other software application. It is also believed desirable that the voter checks that the codes are properly posted. The so-called electronic "bulletin board" system is well-known for such public and verifiable posting, as evidenced by the extensive literature on the subject. Various improvements to these techniques by the present applicant are disclosed in co-pending applications.

Referring to step 17, the tally is posted and proven to correspond to the published data and coded votes on the bulletin board. Votes for uncounted ballots will not yield votes, but may be stopped from being counted, such as by the pre-filled results rows entries mentioned already.

More particularly, various voter-verifiable techniques are known; however, the particular example tables shown will be described for clarity. First the results and intermediate position columns are populated (they were initially empty as mentioned earlier). Then a later public random value, such as described with reference to step 12, but where the unpredictability begins after the population mentioned, may be used. The random values determine which of the ballot row and results row pointer is to be revealed for each respective row, in some example audit schemes. Other audit schemes being well known in the cryptographic election integrity art.

Referring to step 18, the encrypted indices posted in step 14 are decrypted without regard for whether their votes would be counted or not.

More particularly, at a stage that is believed desirable later than the bulletin-board is populated or after the verifiability of the election, the encryption of the voter address may be revealed in some examples for auditing. Other types of auditing, not requiring the voter identities to be made public, will also be further described later.

Figure 2:
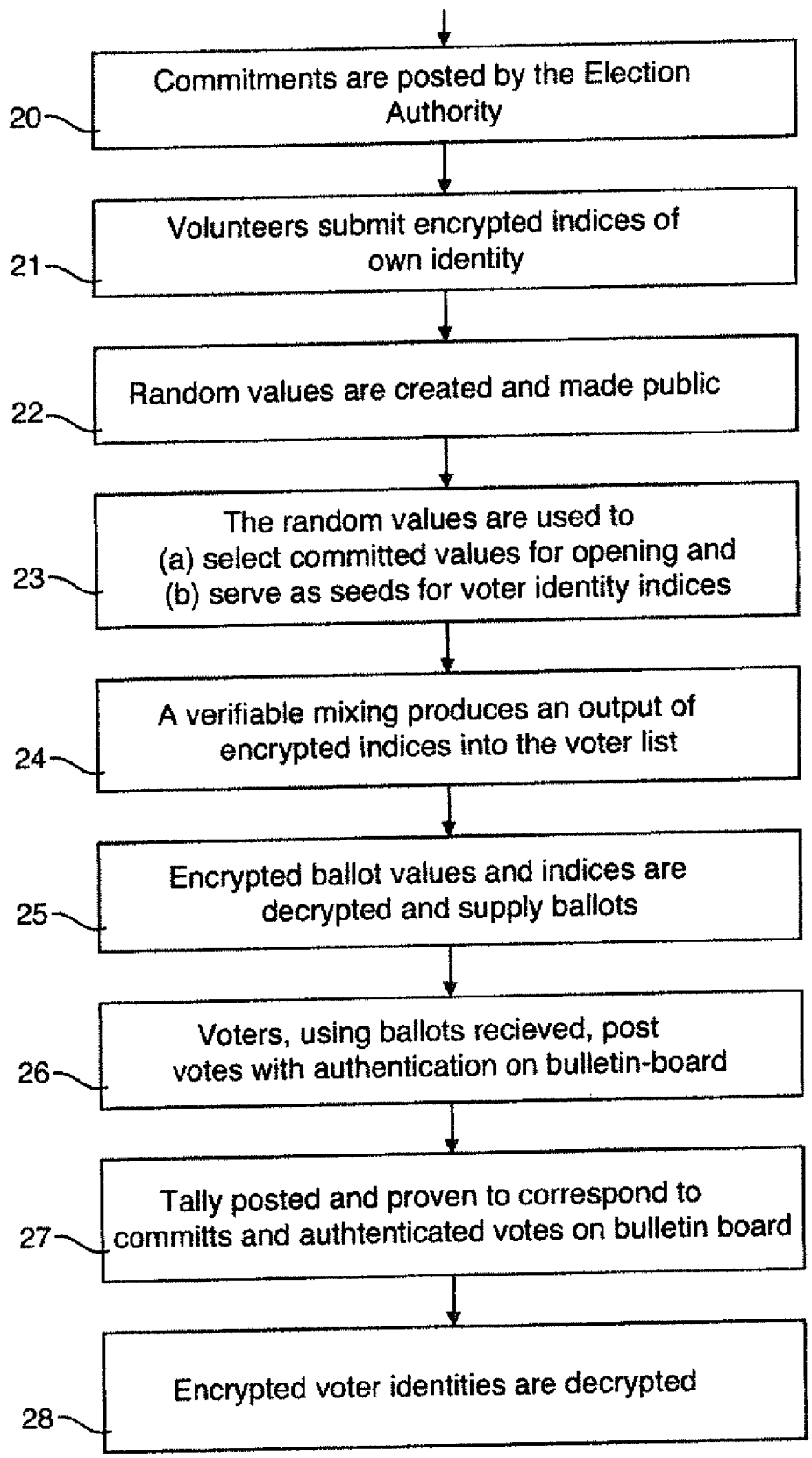
FIG. 2 shows a protocol diagram of an exemplary cryptographic commitment system in accordance with the teachings of the invention.

Turning now to FIG. 2, a flowchart in accordance with the teachings of the present invention will be described in detail. Each of the nine steps already described with reference to FIG. 1 are summarized in the flowchart. The protocol described is somewhat more generic than the very concrete protocol description presented with reference to FIG. 1, as will be appreciated, was for clarity. In particular, for instance, the box for step 20 indicates only some form of commitment being made by the Election Authority, which may be comprised of one organization/individual and/or a quorum of organizations/individuals or a more complex structuring of participants, as are known in some cryptographic protocol settings.

As another example, the box for step 21 calls out voter identification and not address, as other procedures for voters to obtain ballots are anticipated, such as, without limitation, by in person visit or online or various combinations of techniques.

Boxes for steps 22 and 23 correspond to the steps described but in less detailed and more generic language.

The box for step (4) as yet another example calls for a verifiable "mixing," being more generally whatever cryptographic protocol, no matter how it works, accomplishing the result so hiding the input and output correspondence.

The box of step 25, as still another example, calls out the "supply" of ballots, more generally, rather than the particular steps of printing and mailing ballot forms.

The box of step 26, as yet still another example, calls for voters posting votes with authentication, more generally than using coded votes.

The box of step 27, as yet again another example, calls for a generic cryptographic election verification process of whatever type.

And finally, the box of step 28, as still again another example, refers to voter identity information more generally as contrasted with the more specific voter addresses.

Turning now to FIG. 3, a detailed exemplary combination cryptographic protocol, functional, flow chart, and block diagram of a requesting voter non-count verification is provided in accordance with the teachings of the invention. A party who requests a ballot, it is believed, may advantageously verify that votes cast using a particular ballot will not be included in the tally of the election. Box 39 shows such a verification step and/or cryptographic process; boxes 30 through 38 are essentially the same as boxes 20 through 28, as already described with reference to FIG. 2 and will not be described again here for clarity.

It will be appreciated that the requesting voter in the protocol already described has submitted the mix input or onion that will be peeled to reveal the voter address, as already described. It will now also be understood that if those performing the mixing, already described with reference to step 14 of FIG. 1, were to publish the intermediate outputs of the mixing rounds (such publishing being known and two such rounds being shown in the example), then the secrecy of the mix permutation(s) would not be compromised; however, the requesting voter would, accordingly, be able to check in at least some exemplary mixing embodiments that the onion supplied was in fact included in the input and even that it was properly decrypted in stages and resulted in the output including the address. Thus, the requesting voter can verify that the ballot corresponds to a row in the tables 10 shown.

In order to allow the requesting voter to ensure that the ballot received pursuant to the request will not be counted in the tally, the election authority can further open the rows in the tables 10 that correspond to the ballot. Such opening is preferably what may here be called a "private opening," an opening available only to the corresponding requesting voter. An example way to create such a private opening would be for the election authority to encrypt the data that would be revealed by the opening and supply the data to the requesting voter in encrypted form. In one example, such encryption could be by a key secret to the requesting voter and the election authority; in another example, for instance, the encryption by the election authority could be using a public key for which the requesting voter knows the corresponding private key.

Corresponding to current election practice, in some exemplary embodiments, the randomly-selected voters can include essentially all voters, as will readily be understood. Choosing all among all is a trivial or boundary or special case of a random selection of a proper subset, as will readily be appreciated. In such a setting, for clarity, the randomly-selected voters may here be called "regular voters" for clarity.

The requesting voters, who are believed typically in such examples to be performing the role of regular voters as well, will accordingly receive two ballots: one ballot whose votes should be counted and one ballot whose votes should not be counted. The ballots are identified by their serial numbers, for instance, as already explained and shown with reference to step 10 of FIG. 1. Accordingly, the voter will be able to distinguish between the two ballots. Thus, in the role of requesting voter, the requested ballot is received and recognized as such and can be sold to a vote buyer with significant confidence that both a vote cast with it will not be counted and that the fact that it was a requested ballot will not be revealed to the vote buyer, ideally even after the election.

In some examples, some or all of the regular voters (that can obviously also here be called "unrequesting" voters who receive "unrequested" ballots) may not be requesting voters. It will be understood that such an assignment of voters to roles could, in some examples and settings, it is believed, help a vote buyer to distinguish whether a ballot being offered for sale is an unrequested ballot or a requested ballot. Nevertheless, the inventive aspects already described here are believed to still provide protection apart from this aspect. One example way to address such potential distinguishability, however, would be to hide the identities of one or both class of voter, by whatever means, as will be appreciated.

Turning now to FIG. 4A-D, a detailed exemplary combination cryptographic protocol, functional, and block diagram of an exemplary voting system with integrity that can be verified by any interested party in accordance with the teachings of the invention is shown. FIG. 4A shows two example ballots; 4B is the initial commitments; 4C the bulletin board data; and 4D the partially opened commitments after the election.

Referring more specifically now to FIG. 4A, two example printed paper what may here be called "double ballots" are shown in plan view. Each double ballot includes indicia for an optional title, some optional instructions, and two individual ballot parts. The double ballots have serial numbers "100" and "101" while what may here be called the "single" or "individual" ballots that make up double ballot 100, for instance, have serial numbers "100a" and "100b," as will be seen. Each individual ballot has two columns of values; in the example with a single binary question, each column contains two values, though with more options it is believed that there can be correspondingly more rows, as will readily be understood. The left column of values are what may be called "vote codes" and the right column the "choices" or "votes" available to voters. (It will be appreciated that in some examples the choices are also randomly ordered.)

For instance, the double ballot with serial # "100" contains two vote codes for the voter choice "yes," "9343" and "1134." Single ballot "101a" has vote code 2843 for voter choice "yes." Each voter in this example receives a double ballot and, according to the example instructions, is to choose one of the two individual ballots to vote and supply the electronic bulletin board, as already described, with the vote code that corresponds to the voter choice. For instance, a voter receiving double ballot 101 and wishing to vote "no" may either: (a) select individual ballot 101a and then supply code "6533" to the electronic bulletin board; or (b) select individual ballot 101b and then supply code "8282" to the electronic bulletin board. The ballots are supplied voters before the voting, at least before it closes.

Referring to FIG. 4B, an example instance is shown of a table of values committed to, for instance by the election authority already mentioned. The dotted lines indicate that the values below them are not public but are posted in at least a kind of encrypted form, already described here, called a commitment. The example corresponds to the two example ballots just described with reference to FIG. 4A. Each "row" of the table corresponds to a triple: the serial number of the individual ballot, the vote code, and the vote. For instance, a row for individual ballot "101a" contains this serial number as its first column entry, vote code "2843" as its middle entry, and the vote of "yes" in its third column. The commitment is made before the voting, at least before it opens.

The same values printed on the ballots are to be used in the table; these values would ideally at least include unpredictable vote codes. Other aspects may, it is believed, be chosen at random or with certain relationships and/or distributions. In whatever way the values are chosen, they would be copied into the corresponding portions of the table and ballots. But, as will be understood, the rows of the table can be thought of as randomly permuted and/or the row assignments as randomly selected; the ballots in some examples can be printed or used in a fixed or randomized order.

Referring to FIG. 4C, the electronic bulletin board state is shown with example values that would be present once the two example ballots already described with reference to FIG. 4A, and with data corresponding to that described with reference to FIG. 4B, are voted. The electronic bulletin board has already been described and in some examples may also be described as a provision on computer network servers allowing voters to make values pubic in a way that ideally cannot readily be altered. In particular, the voter who received double-ballot "100" has apparently chosen individual ballot "100a" to vote and has chosen to vote "yes" by providing the vote code "9343" to the electronic bulletin board. Similarly, as will be understood, the voter who received double-ballot "101" has apparently chosen individual ballot "100b" to vote and has chosen to vote "no" by providing the vote code "8282" to the electronic bulletin board.

Referring finally to FIG. 4D, an example instance of a table of values committed to as described with reference to FIG. 4B is shown, but now with some of the values opened as indicated for those values missing the surrounding dotted rectangle. In an example rule and with the example ballots, votes and values already described, the two vote codes that were voted each correspond to a row that remains committed except that its votes are shown. Thus, the tally is readily seen/computed based on these two rows uniquely identified by the patterns of the first two column commitment not being opened. The other data shown still committed is the votes of the other rows of the corresponding individual ballots voted; the so-called "vote" values are shown still committed to. This, it is believed helps protect so-called "ballot secrecy," that is, how the voter voted. Ballots that are not voted, for whatever reason, can be opened fully.

A variation, as will be appreciated, reveals the voted codes but hides the vote for them and reveals the votes for the unvoted codes; accordingly, the votes are flipped for purposes of tally.

Turning now to FIG. 5, a detailed exemplary combination flow chart, cryptographic protocol, functional, and block diagram of an exemplary voting system with integrity that can be verified by any interested party in accordance with the teachings of the invention is shown. The process described was also illustrated by FIG. 4A-D and the corresponding description.

Box 51 shows the creation of a ballot pair information per serial number, each with distinct vote codes per choice, as will be understood. The vote codes are believed at least different for different voter choices within the individual ballot serial number; however, it may be advantageous in some settings to keep the vote codes distinct over a larger range of occurrences, such as even over a complete election or related elections.

Box 52 shows the printing of the ballot pairs. These are as shown in FIG. 4 in the example two individual ballots, with the same serial number, attached such as by perforation.

Box 53 is the encryption of each element of <serial #, vote code, vote> separately and the posting of each triple in a random row. This has already been described with reference to FIG. 4B, as will be understood. The terminology of "encryption and posting" will be appreciated as an alternate way to describe the "commitment" process as already mentioned; what may be called "decryption" can then be considered similar to "opening" as also already mentioned.

Box 54 indicates that voters are each given a printed ballot pair. It will be understood that if the election authority, "EA," were to learn the correspondence between serial numbers and voters, then the EA could link votes to voters. Accordingly, ideally ballots are provided in a randomized order. For attendance voting, ballots are randomly selected by voters from a stack or hopper or the like. For remote voting, paper or electronic ballots may be mailed or otherwise delivered to voters; the linking of the particular instances corresponding to particular voters is preferably kept from the EA. In a practical example, a stack of ballots that have already been folded or covered with scratch off is shuffled repeatedly before being stuff into envelopes for mailing.

Box 55 depicts one ballot being accepted from each voter. If at a polling place unmarked ballots could be accepted into a ballot box, a malfeasant EA could claim that a ballot was not voted when in fact the voter had marked it. One example way to prevent this kind of potential vote cancelling in attendance voting, or the unfounded allegation that it had occurred, would be for the ballot box to be "guarded" by means, human and/or automated, that prevents or at least detects unmarked ballots from being inserted. For instance, the ballots could be folded so that an unmarked position us visible but what vote the correspond to is hidden. In some other examples, the vote codes are protected by scratch-off coating to be removed by the voter, as has been mentioned with reference to FIG. 4A, and the ballot identity is protected by being placed in an envelope that contains a window that exposes the un-scratched vote code.

Box 56 is the opening, in case there are unvoted ballots, of all encryptions related to such ballots. It will be understood that by so opening these ballots they are cancelled from the tables and so ballots that remain in the table can, in some examples, be considered ideally one per voter. (In some further examples to be described, such as with reference to FIG. 7 and FIG. 8, there may be ballots that are known to be so-called requested or that may be called "decoy" ballots, and the initial total number of ballots in the commitment table can be the sum of the decoy ballots and the regular ballots) Once polls close, any unvoted ballots are believed preferably removed from consideration by being fully opened, as already mentioned.

Finally, now, box 57 is processing for ballots voted. For each row voted, the vote element of the triple is opened; if the row is unvoted, both the serial and vote code elements are opened. At this point the tally can be computed by adding the opened votes. Also, anyone should, ideally, be able to verify that the codes voted, as seen on the electronic bulletin board described with reference to FIG. 4, are not shown; if they are opened, an error or malfeasance is believed to be indicated and in some examples the corresponding voter might request the voted individual ballot be shown. In some optional example embodiments, the vote codes are only revealed in part during a first period to allow voters to register complaints; a complaint would include the remainder of the vote code, as it should be known to the voter. During the corresponding second period, the remaining portions of the vote codes are revealed; if there is a match with a complaint, malfeasance is believed indicated, at least with some probability.

Turning now to FIG. 6, a detailed exemplary combination flow chart, cryptographic protocol, functional, and block diagram of an exemplary remote voting system with randomly selected voters and integrity that can be verified by any interested party is shown in accordance with the teachings of the invention. The process described was also illustrated by FIG. 4A-D and the corresponding description.

Box 61 is the creation of a ballot pair per serial number, each with distinct vote codes per choice, much as already described with reference to FIG. 5 box 51.

Box 62 is the ballot printing much as already described with reference to FIG. 5 box 52, or the equivalent forming of the corresponding electronic image.

Box 63 is the commitment to each element of <serial, vote code, vote> separately, much as already described with reference to box FIG. 5 box 53.

Box 64 is the sending of ballots to voters, such as physically by mail or electronically, such as by email. In this embodiment, ballots can be in some examples be sent a randomly selected subset of voters. For instance, a batch of ballots may be paired each with a mailing label chosen randomly from a large collection of such labels.

Box 65 is the accepting of one ballot from each of the randomly selected voters (e.g., online with serial number and code posted on bulletin board).

Box 66, like box 56 already described with reference to FIG. 5, is the opening of all the encryptions of any ballot not voted.

Box 67, like box 56 already described with reference to FIG. 5, is the opening related to voted ballots: if row voted, open vote only; if row unvoted, open serial and vote code.

Turning now to FIG. 7A-D, a detailed exemplary combination cryptographic protocol, functional, and block diagram of an exemplary remote voting system with decoy ballots and integrity that may be verified by any interested party is shown in accordance with the teachings of the invention. The figure is organized much as with FIG. 4: FIG. 7A shows two example ballots; 7B is the initial commitments; 7C the bulletin board data; and 4D the partially opened commitments after the election. As will be appreciated, and for clarity, the description already provided with reference to FIG. 4 will be relied on and what are believed example difference between this and the setting of FIG. 4 will be highlighted described in detail here.

Referring now more particularly to FIG. 7A, two ballots are shown. They are the same as of FIG. 4A, for clarity and simplicity, but one of them will not be counted in the tally because it is what will be called here a "decoy" ballot, which is essentially what has been called elsewhere here a requested ballot. The ballot is believed "indistinguishable" from what may here be called a "countable" ballot; put differently, the two look the same but the table has encoded ballot "101" as a decoy, as will be described more fully below.

Referring to FIG. 7B, the committed table is essentially the same as that already described with reference to FIG. 4B, apart from the inclusion here of a new column, labeled "countable/dummy." The entries in this new column are the letter codes for countable and "D" for dummy. As can be seen, ballot "100" has been marked countable and ballot "101" dummy, in each of their rows.

Referring to FIG. 7C, the electronic bulletin board has the same end state as already described with reference to FIG. 4C, again as will be appreciated for simplicity and clarity.

Referring to FIG. 7D, there is an additional column compared to FIG. 4D, just as with FIG. 7B, compared to FIG. 4B. It will be seen that there is a further column on the right for the respective countable/dummy indicators. Furthermore, it will be appreciated that the only rows for which these indicators are opened correspond to the two codes voted. Thus, voted "yes" voted from ballots "100a" with code "9343" is counted, as indicated by the "C"; but, the "no" voted from ballots "101b" with code "8282" is a dummy and not counted in the tally total, as indicated by the "c." Which of the double ballots, "100" or "101," was the dummy, however, remains hidden.

Turning now, finally, to FIG. 8, a detailed exemplary combination flow chart, cryptographic protocol, functional, and block diagram of an exemplary remote voting system with randomly selected voters, decoy ballots, and integrity that may be verified by any interested party in accordance with the teachings of the invention is shown. The process described was also illustrated by FIG. 7A-D and the corresponding description; it is also similar to that already described, such as with reference to the process of FIG. 6, with some differences. As will be appreciated, again, the description will highlight the differences of this embodiment with those already described, for clarity.

Box 81 is again the creation of a ballot pair per serial number, each with distinct vote codes per choice; most it is believed can be expected to be marked countable, some marked dummy.

Box 82 is the printing of ballot pairs, or the electronic equivalent of rendering them, without countable/dummy indication.

Box 83 is the formation of the commitment table. This entails encrypting each element of <serial, vote code, vote, countable/dummy> separately and posts each quadruple in a random row.

Box 84 is the sending of ballots to each regular voter and fulfilling accepted dummy ballot requests by providing a corresponding dummy ballot to each.

Box 85 shows that ballots voted online result in serial number and code posted on bulletin board.

Box 86 is the opening of serial, vote code, and vote encryptions of ballots not voted. It will be appreciated that such opening is for reasons and has advantages already described; however, opening the counted/dummy tag is not believed advantageous as it is believed that a vote buyer for instance might opt to not to vote it or have it voted and then learn if the seller were supplying a decoy.

Box 87, finally, is the opening of commitments. As already described with reference to FIG. 7D: if the row was voted, open vote and countable/dummy; if the row was unvoted, open serial and vote code.

While these descriptions of the present invention have been given as examples, it will be appreciated by those of ordinary skill in the art that various modifications, alternate configurations and equivalents may be employed without departing from the spirit and scope of the present invention.

All manner of variations, generalizations and extensions are anticipated. As just one example, each verifier is provided with a voter identity and each voter optionally with a confirmation code. The verifier contacts the voter and obtains the confirmation code. A random selection of the digits of the confirmation code are provided to the verifier along with the voter identity, so that the verifier can check the validity of the confirmation code and the voter cannot, at least with significant probably of detection, cheat the verifier. The verifiers may be selected by a third portion of the input batch as described, with random identities, and be paired with voter identities. The confirmation codes and random selections of digits may, for instance, be constructed by the election authority. As another example, a multiparty protocol may be employed, instead of using a single election authority, as has been mentioned and will be understood.

Another embodiment of the invention is shown in FIGS. 9-12. Turning now to FIG. 9, a combination block and cryptographic protocol diagram of secure sample voting is shown in accordance with the teachings of the present invention. Also indicated in the description are the numbers for the steps of FIG. 10, to be described further later.

(Step 1110) The EA ("Election Authority") commits to: a "voter roster" 1020 (plaintext or row encrypted); one summand 1030 per ballot 1010 (or address label) to be printed, row-encrypted; and, e.g., fifty pairs of two rows 1060 and 1080 per ballot, row-encrypted. Before encryption, each of the pairs 1060 and 1080 has been randomly permuted, with the same permutation applied to both lists of the same pair, but a different random permutation applied to each pair. Each of the two rows per ballot corresponds to a vote code and its associated vote, which for some ballots can be "decoy" for both votes. Each encryption uses a different key, with any so-called "cryptographic commitment" scheme believed suitable for use.

(Step 1120) The public summands 1040 are determined by a publicly-verifiable draw, such as a specific future blockchain hash. There is, in the example, one public summand per address to be printed. The index of the address to be printed is determined by the EA adding the two summands 1060 and 1080, component-wise. Each resulting sum is reduced modulo the total number of voters on the roster 1020, 10,000 voters in the example for clarity, thereby believed to determine a voter address on the roster unpredictably and uniformly at random. If the roster were encrypted, its corresponding row would be decrypted when both summands are revealed in audit.

(Step 1130) The EA prints the addresses on the envelopes 1090, and then hides this printing, such as with opaque tape 1091. The EA also prints a number of ballots 1010, equal the number of envelopes 1090, each hidden such as by scratch-off 1095. Some of these ballots optionally are decoy and the EA segregates any decoys and in the example keeps them in order of printing.

(Step 1140) A public "ceremony" is conducted to which the EA provides the envelopes and the non-segregated ballots, each in a separate sealed oversized-container, such as for instance a cardboard box sealed with tamper-indicating tape (not shown for clarity). The participants at the ceremony, so as to verifiably thoroughly-mix the contents, physically tumble the containers. Then they open the containers and stuff the envelopes 1090 with the ballots 1010. The envelopes remaining are stuffed by the EA with the segregated ballots, but the EA is allowed to privately peek at the addresses while stuffing the envelopes (resulting in the EA knowing the address on the envelope corresponding to each decoy ballot, so that it can send the proofs of decoy to the correct addresses).

The participants at the ceremony can pick a number of the stuffed envelopes and ballots to be audited at the ceremony. The physical hiding layers 1091 and 1095 are removed, revealing the addresses and the ballot printing, and these audited ballots become un-votable. The EA posts all the row keys used to encrypt each audited address and ballot (allowing anyone to check that the decryptions match what was shown publicly at the ceremony).

Additional audit can it is believed be provided by allowing some auditors to peek at some addresses (under the hiding layer 1091) before the envelope and its contained ballot are verifiably shredded, both for real and for decoy ballots. Such a "peek" auditor of a real ballot can check to see if the addressee was contacted with knowledge that he/she was a voter, which it is believed should never happen if the EA is honest and does not leak information; a decoy ballot peek auditor can check that the addressee was in fact provided by the EA with a valid what may here be called a "proof of decoy." A simple such proof is the row positions of the respective ballot in all tables. The participants then stuff the ballots. The stuffed ballots have their address-hiding 1091 removed before being mailed. This can best be done blind, such as in a glove box that is then emptied directly into postal collection boxes.

(Step 1150) Voters, following the instructions printed on the ballots, each provide a ballot serial number and vote code online. (A known example way to accomplish this is by the ballot numbers and vote codes being chosen from a large enough space of at least roughly equally-likely values that the online servers receiving the codes can have only enough information to verify that the codes are in a valid subspace with high probability with only a negligible probability of being able to successfully counterfeit ballots and essentially no way to learn which votes are cast.)

(Step 1160) After close of polls, the EA reveals the second columns 1070 by posting one for each of the already published column pairs 1060 and 1080. These second columns 1070 are to include the voted indication—whether voted, decoy, or audited. These should be permuted exactly as the corresponding already-published pair 1070.

(Step 1170) A random draw of, for example, fifty bits is used. Ideally it believed best to have at least roughly equal number of ones and zeroes (e.g., by draw without replacement until twenty five positions are determined). It is believed it should be unpredictable until the last commitments are posted.

(Step 1180) Each bit of the second draw indicates, for the respective copy of the columns: "0" indicates that the first column 1060 should be fully decrypted, "1" indicates that the third column 1080 should be fully decrypted.

Turning now to FIG. 10, a combination block diagram of secure sample voting is shown in accordance with the teachings of the present invention. The eight steps described here were also referred to in the description of the previous FIG. 9.

Referring to step 1110, what is called out is "EA commits to voter roster, summand list per ballot, and multiple planes of two row-encrypted permuted columns, two per ballot."

Referring to step 1120, what is called out is "Draw determines public summands and these. combined with committed summands, determine index into roster of the voters to be sampled."

Referring to step 1130, what is called out is "EA prints addresses on envelopes and vote-codes on ballots; each hidden by an attached layer; decoy ballots are kept segregated."

Referring to step 1140, what is called out is "Envelopes and/or real ballots are mixed and then publicly stuffed; the decoy ballots are stuffed but the EA knows which ones are sent which voters; a public audit of some envelopes/ballots is conducted and the corresponding commitments opened; optionally, some ballots are peeked at by auditors and then destroyed."

Referring to step 1150, what is called out is "Vote codes are collected from voters; the received codes are optionally confirmed by verifying a check property of valid codes."

Referring to step 1160, what is called out is "EA reveals a column for each plane, permuted as the two committed columns of that plane, including at least voted and not voted indications."

Referring to step 1170, what is called out is "Draw determines some number of random bits, ideally with roughly equal number of ones and zeros."

Referring to step 1180, what is called out is "For 1 bit, open first column of respective plane; for 0 bit, open third column of respective plane; tally is exposed redundantly by each plane."

An example use scenario will now be described informally and specifically for clarity, as will be appreciated, without any limitation whatsoever. For concreteness, the EA will be referred to as "Joe."

To get started running an election, Joe obtains the open source software, installs it, and runs it. He enters the "ballot question" he wants voted on and three date/times: opening of polls, closing of polls, and start of a "ceremony" for auditing and mailing the ballots. The software then uploads a hash value to a blockchain (step 1110 and 1120).

Joe also is believed to require some physical supplies. He purchases 1,000 each: envelopes, printer labels (e.g., Avery 5163), stamps, stick-on scratch-off circles, and unprinted 3"×5" cards. He additionally needs to obtain some black masking tape, some tamper-indicating tape, and a couple of large cardboard boxes.

The software, with a small delay after publishing to the blockchain, renders ballots and address labels, which Joe prints (step 1130) using the supplies. He sticks the labels and stamps on the envelopes and covers each address with a piece of black tape, (taking care to only place tape on the label, not the envelope, for easy tape removal). He then places the envelopes in one of the large boxes and seals the box with the tamper-indicating tape. He next prints the ballots on the 3"×5" cards and covers their printed "vote codes" with the scratch-off stickers. He puts the ballots in the second large box and similarly seals it.

The software has generated secret "shares" that give the ability to complete the election once the shares are input back into a fresh version of the software. Joe can request that the software form the shares so that any majority of shares is enough to complete the election. Joe can then distribute the shares to people he trusts and ask the software to erase any trace of them. (He could even provide the boxes, or portions of box content in small packages sealed with the tamper-indicating tape, to others for safe-keeping until the ceremony.) The printing should ideally be done without Joe even looking at the printed information, an aspect that could be corroborated by someone else or a video of the printing. Only once the ballots and envelopes are safely sealed away, the shares safely distributed, and all secrets erased by the software, does Joe announce the election and invite people to the ceremony.

Joe should invite ceremony participants from various sides of the question to be voted on. When Joe and the participants appear at the appointed time and place for the ceremony, they can even flip coins to decide between possible venues to hold the ceremony. The participants are not only free to record videos or livestream the ceremony but are encouraged to do so.

To start the ceremony, the two boxes, one containing addressed envelopes and the other the ballots, are tossed around to make sure their contents are mixed up thoroughly (step 1140a). Then the participants open the boxes and pick out some envelopes and ballots to be "audited." Joe, with help from the software and a majority of those holding shares, posts on the blockchain only those keys that decrypt the encryptions related to the audited items (step 1140b). The participants, and anyone else during the online video streaming or later, can check the posted keys online using open source software and make sure that what Joe originally encrypted and committed on the blockchain matches the printing that was audited.

Some participants can be allowed to pick a few envelopes each (step 1140d), look at the addresses, and then verifiably shred these ballots and envelopes in front of everyone at the ceremony. (This lets them later check with the voters at those addresses to make sure that nobody has contacted the voters, which could only happen if Joe leaked the addresses to someone who tried to influence the outcome.)

So-called "decoy" ballots can reduce the effectiveness of vote buying and the software allows Joe this option. Decoy ballots look like "real" ballots, but a voter receiving one is to be notified (by a separate letter Joe sends) that the ballot will not be counted and that the recipient should ideally try to sell the ballot to help with integrity of the election process, and possibly even to make some extra money.

Should Joe decide to issue decoys, he keeps some of the printed ballots that the software indicates are decoys out of the box. After the usual envelope stuffing at the ceremony, there should be some extra envelopes. Joe then stuffs (1140c) these leftover envelopes himself, but is allowed peek at and note the addresses. He does this preserving the order that the decoys were printed in, so he knows which decoy ballot will be sent which voter. When Joe later supplies this information to the software, it prepares individual "proofs of decoy" and corresponding address labels for each, so Joe can send them out separately. Voters receiving a proof-of-decoy can look it up online, using the open source software, and be certain that the ballot is in fact a decoy; but without this information, the vote buyer will forever be unable to tell it is a decoy.

Decoys can be audited in a similar manner to real ballots (step 1140e): some participants can be allowed to pick a few decoy ballot envelopes each, peek at the addresses before verifiably shredding the whole stuffed envelopes in front of everyone at the ceremony. (This lets them later check with the addressees to make sure Joe sent out the proof of decoys.)

Arm holes are cut in the boxes so that participants can reach into the boxes without anyone seeing what is exposed within the boxes. Participants then take turns reaching in through the arm holes and removing the black tape from each envelope in the box. Participants can even travel together to some postal collection boxes and deposit the envelopes directly from the cardboard boxes into the postal boxes. They should never see, or expose to view, any addresses to which a ballot is actually mailed.

Voters follow the instructions on the ballots received, which direct them to one or more voter websites. They visit one and there enter their ballot number and vote code (step 1150) and can even verify that the values they provide are posted on the blockchain.

After the date and time Joe originally set for close of polls, which was committed on the blockchain, he runs the final step of the software. One thing it does is post lists of votes cast (step 1160), each in a specific order. The other thing it does is get a hash from the blockchain and post the keys determined by that hash to the blockchain. To do this, the software needs a majority of the shares Joe distributed. The keys posted (step 1170) decrypt the values revealing the tally and allowing it to be audited. Anyone can then use the open source software, or even write their own software, to check (step 1180) the audits and verify the correctness of the tally.

Turning now to FIGS. 11A and 11B, a detailed combination block and schematic diagram of an exemplary multiparty election authority voting system is shown. FIG. 11A is the providing of ballots, including optionally decoy ballots, to potential voters; FIG. 11B is the voting by voters and the revealing of results of a corresponding election.

Referring now more specifically to FIG. 11A, three multiparty computations are shown. Each transforms its inputs in the example from the same list, or subsets of the list. For example, transform 1210 uses a first permutation, as indicated by "p1," and transforms the integer inputs with a key, as indicated by "k1," into encrypted values delivered to voters. Each encryption includes a contribution from each of the multiple parties, not shown for clarity, running the election. Each transformation in the example also includes mixing, by each of the multiple parties successively, also not shown for clarity.

The operation shown by the box is what may be called a multiparty mixing cascade, as is known in the art, where each node applies a cryptographic operation (shown as key k1) to each message as well as permutes (shown as permutation p1) the messages. As an example, the mixing with encryption disclosed in the co-pending application, by the same applicant, US 2018/0139190 "Precomputed and transactional mixing" published May 17, 2018, which is included hereby by reference herein as if copied here in its entirety, described with reference to FIG. 16A is an example.

Box 1210, in the example, provides vote codes corresponding to votes one through five; the vote code is, as will be understood, the encryption with k1 of the corresponding vote. Similarly, transform 1220 encrypts and mixes, but it is used in this example to send a second vote code, likely distinct from the first vote code per voter of box 1210, to each voter. In the example, for clarity, the five votes are six through ten. For example, the codes of box 1210 can be agreed to mean a "yes" vote and the codes of box 1220 a "no" vote.

Box 1230 is an example of optional decoy ballots. The decoys are shown as a "d" and would not be counted; the real ballots are shown as "r" and are to be counted. A suitable method of delivery would ideally be used. In an electronic messaging environment, the decoy indication (or proof of decoy, which can be sent the same way as or in place of an indication of decoy, is not shown here for clarity but described elsewhere) it is believed should be sent in such a way that a vote-buyer cannot readily verify if it were sent. One example way to achieve this would be by an unexpected choice of messaging system or even a physical message or mail and/or other out-of-band messaging. Another example way to achieve this, it is believed, uses what is known in the art as "deniable authentication." This has message content that the recipient can later say was different than it actually was. Examples are use of one-time pad for content in an otherwise authenticated message. For clarity, a different key, k2, is shown used here.

Referring now to FIG. 11B, exemplary voting and tallying are shown.

Box 1250 takes vote codes supplied by voters and transforms them, using key k1 and permutation p2, into corresponding choice of votes, as has been explained. The vote codes supplied are as they were received by the voters, multiparty encrypted with key k1. Box 1250 permutes or mixes these encrypted vote codes; box 1250 also decrypts the vote codes using k1. The result is a set of vote codes. (Which codes are decoys are marked by the positions input to box 1230 that are "d," and so the vote code that decrypted to three in the example would be recognized during tally as a decoy and not counted.) The permutation used to decrypt the votes in box 1250, p2, is believed to not need to be the same as p1, since the vote decryption results in the input to the vote codes being revealed.

Turning now to FIG. 12, a detailed combination flowchart and block diagram of an exemplary multiparty election authority voting system is shown.

Box 1310 contains "send multiparty-encrypted vote-codes, through a first multiparty permutation, to voters." It is the delivery, through a multiparty mix, of the vote codes. Each code enters the mix in cleartext, but is encrypted further at each stage of the cascade as the message batch is operated on by each successive node, as will be understood. The result is that encrypted inputs, that serve as "vote codes"

in this example embodiment, are delivered to voters, but the individual or partial collusion of the multiple parties performing the operation learn neither the codes nor which voter receives which codes.

Box 1320 contains "optionally, send multiparty encrypted at least decoy indications, through first multiparty permutation, to voters at least somewhat deniably." It is the delivery, ideally by a means a vote buyer would not be able to verify the content of, of the indication of decoy and/or the proof of decoy. These two aspects could be delivered together or in some examples separately and/or in a multiparty encryption style that would have to be combined to be read.

Box 1330 contains "permute, through second multiparty permutation, the vote codes received." This is the hiding of who submits which vote. It can, in some examples, be computed through a mix or other untraceable sending.

Box 1340 contains "reveal election result by multiparty decrypt of codes received." It is the multiparty decryption of the votes. It will be appreciated that boxes 1330 and box 1340 can be combined into a single multiparty computation, much as with box 1210 and its description in box 1310; however, in some embodiments it is believed that they may advantageously be separated as described here.

What is claimed is:

1. A computerized cryptographic method for at least one election authority to conduct an election where at least some voters vote remotely, comprising:
   the at least one election authority providing ballots to voters, the ballots including vote-codes;
   some of the ballots are decoy ballots, where which ballots are decoy ballets is known to the at least one election authority;
   receiving by the at least one election authority from at least one voter at least one of the vote-codes;
   such that at least from some observers at least something is hidden about which voters receive which ballots or which vote codes;
   such that at least from some observers, at least something is hidden about which ballots are decoy ballots; and
   such that decoy ballots will not be counted and yet an integrity of a tally of non-decoy ballots can be substantially verified by any interested party.

2. The voting method of claim 1,
   wherein the decoy ballots being provided by a method selected from the group consisting of: unpredictable, responsive to requests, an auction, and algorithmically responsive at least to information about voters.

3. The voting method of claim 1, wherein
   at least one of the at least one voter that a decoy ballot is issued to being supplied a substantial proof that the ballot is a decoy.

4. The method of claim 1, wherein the providing of ballots includes physically combining ballots with hidden vote codes within envelopes that are addressed with temporarily hidden addresses.

5. The method of claim 2, wherein the providing of ballots includes physically combining ballots with hidden vote codes within envelopes that are addressed with temporarily hidden addresses.

6. The method of claim 3, wherein the providing of ballots includes physically combining ballots with hidden vote codes within envelopes that are addressed with temporarily hidden addresses.

7. The method of claim 1, wherein the providing of ballots includes a multiparty mixing of recipients of the vote codes.

8. The method of claim 2, wherein the providing of ballots includes a multiparty mixing of recipients of the vote codes.

9. The method of claim 3, wherein the providing of ballots includes a multiparty mixing of recipients of the vote codes.

10. The method of claim 7, wherein the providing of ballots includes a multiparty transformation of the vote codes.

11. The method of claim 7, wherein the providing of ballots includes a mixing of decoy ballots along with real ballots.

12. The method of claim 11, comprising delivering to voters receiving decoy ballots by deniable encryption an indication of whether the ballot is a decoy.

* * * * *